UNITED STATES PATENT OFFICE.

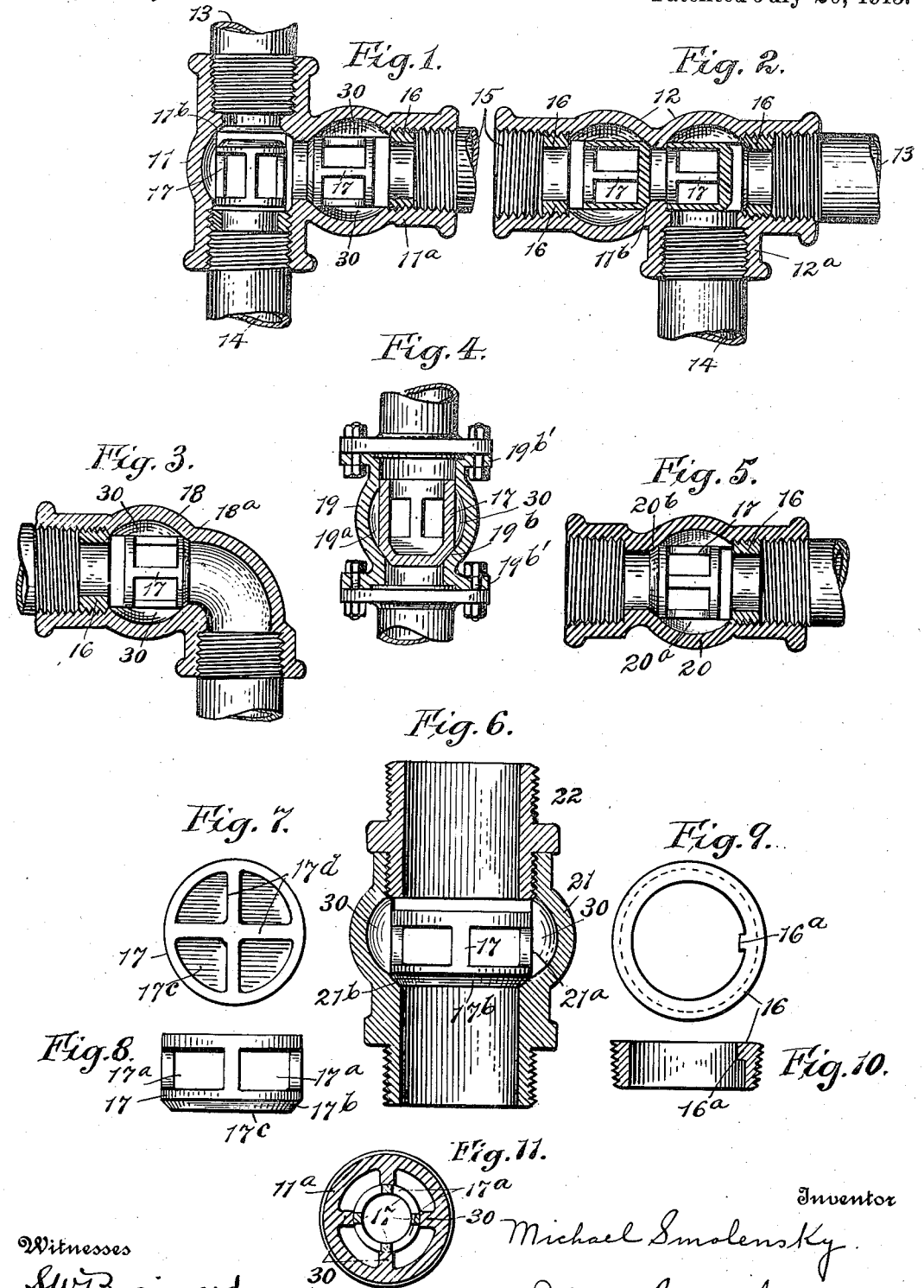

MICHAEL SMOLENSKY, OF CLEVELAND, OHIO.

CHECK-VALVE.

1,147,343.  Specification of Letters Patent.  Patented July 20, 1915.

Application filed February 23, 1915. Serial No. 9,884.

*To all whom it may concern:*

Be it known that I, MICHAEL SMOLENSKY, subject of the Emperor of Austria-Hungary, residing at Cleveland, in the county of Cuyahoga and State of Ohio, have invented certain new and useful Improvements in Check-Valves, of which the following is a specification.

This invention relates to check valves, and is capable of use in pipes for conducting fluid of various kinds, either liquid or gases.

The object of the invention is to provide a valve construction in which separate valve seats are unnecessary, the seat being a part of the pipe; also separate guides for the valve are unnecessary; also, the valve itself can be cheaply constructed, being made in one piece, and it is lighter than ordinary check valves, and works to better advantage.

The valve is made in skeleton form, and is characterized by the fact that it is hollow, or cup shaped, and has passages through which the fluid flows when the valve is open.

Various uses of the valve are shown in the accompanying drawings.

Figures 1 and 2 are sectional views of a pump valve arrangement. Fig. 3 is a similar view showing the valve in an elbow. Fig. 4 is a similar view of the valve in a flanged connection. Fig. 5 is a similar view in a straight coupling connection. Fig. 6 is a similar view of a modified coupling connection. Fig. 7 is a plan view of the valve itself. Fig. 8 is a side view thereof. Figs. 9 and 10 are plan and sectional views of a retaining ring. Fig. 11 is a section on the line 11—11 of Fig. 1.

Referring specifically to the drawings, Fig. 1 shows a T-casing 11 suitable for pumps, having an inlet at 13, a connection 14 which may be connected to the pump, and a discharge outlet at 15. One valve 17 is arranged vertically, and another horizontally, or in other words the valves are at a right angle to each other. The seat $11^b$ for each valve is integral with the casing, which is recessed, or made in globular form, to provide a passage around the sides of the valve, and this globular body has integral inner guide ribs 30 which extend lengthwise and which hold the valve in place.

In Fig. 1, $11^a$ indicates the discharge portion of the casing and one of the valves is similarly placed therein, the parts being disposed in such relation that the discharge connection opens into the recess containing the other or inlet valve.

The valve itself consists of a cup shaped member having a closed bottom $17^c$ and the edge of which is beveled as indicated at $17^b$, and the side wall of the cup has openings $17^a$. $17^d$ are arms between the rim of the cup, to strengthen the same. There can thus be a flow through the openings $17^a$ of the valve and between the arm $17^d$.

In Fig. 2 a pump arrangement is shown in which the inlet and outlet valves are located on the same line, one opening one way to admit fluid to the pipe 14, and the other opening the same way to permit flow therefrom, the valve casing in this instance being indicated at 12. 16 are rings screwed into the ends of the casing, behind the valves, to retain the same therein.

Fig. 3 shows an elbow connection or casing 18 with a seat at $18^a$.

In Fig. 4 a single valve is shown, with a flanged casing 19, guides $19^a$, and seat $19^b$, and flanges $19^{b'}$ for pipe connections.

Fig. 5 shows a threaded coupling 20 with guide $20^a$, seat $20^b$ and retaining ring 16.

Fig. 6 is a similar connection, the casing being indicated at 21 and having guides $21^a$ and seat $21^b$. This connection is threaded outside at its lower end, and is threaded inside at its upper end to receive the coupling 22 which also serves as a retainer for the valve.

The retaining ring 16, shown in some of the forms, has a lug $16^a$ to take a wrench so that the ring may be screwed in or out.

In any of the forms shown the casing may be cast with the guides and the seat or seats integral therewith, and the valve or valves, and the retainer rings if any, slipped into place, the valve being made in one piece.

When the valve seats the bottom $17^c$ closes the passage. When the valve opens the flow passes over the valve seat, between the guides, and through the openings $17^a$ and the open end of the cup, in an obvious manner. There is no possibility of the valve becoming cocked, and the casing can be easily cast, as it has no cross pieces such as are necessary to guide a valve stem or the like.

What I claim as new is:

1. A valve structure comprising a T-casing having an enlarged body part and a branch opening into said enlarged part at the side thereof, said enlarged part having a seat at one side of the opening to said branch, a cupped valve slidable in said enlarged part, beside said opening, to and from the seat, the valve having openings in the side wall thereof, and a retaining ring for the valve, in said body, at the side of the opening opposite to said seat.

2. A valve structure comprising an integral T-casing having a body part and a branch part each with an enlarged valve chamber and a seat therein, the branch communicating with the chamber in the body part, and a valve coöperating with the seat in each part, the valve in the body part being cupped and working across the opening to the branch, said valve having an opening in the side thereof, to permit flow to said branch.

In testimony whereof, I affix my signature in presence of two witnesses.

MICHAEL SMOLENSKY.

Witnesses:
JOHN A. BOMMHARDT,
J. B. DANA.